United States Patent [19]

Fujita et al.

[11] 3,946,985

[45] Mar. 30, 1976

[54] VALVE DEVICE FOR GASES

[75] Inventors: Tomomitsu Fujita, Yokohama; Yoshiaki Imai, Tokyo, both of Japan

[73] Assignee: Tokico Ltd., Kawasaki, Japan

[22] Filed: Feb. 26, 1975

[21] Appl. No.: 553,307

[30] Foreign Application Priority Data

Feb. 28, 1974 Japan.................................. 49-23989
Feb. 28, 1974 Japan.................................. 49-23990
Feb. 28, 1974 Japan.................................. 49-24497

[52] U.S. Cl. ................... 251/130; 251/30; 251/134
[51] Int. Cl.² ........................................... F16K 31/05
[58] Field of Search...................... 251/130, 134, 30

[56] References Cited
UNITED STATES PATENTS

| | | | |
|---|---|---|---|
| 3,700,085 | 10/1972 | Balz................................ | 251/134 X |
| 3,720,295 | 3/1973 | Balz................................ | 251/134 X |
| 3,845,788 | 11/1974 | Laven............................. | 251/134 X |

*Primary Examiner*—Arnold Rosenthal
*Attorney, Agent, or Firm*—Waters, Schwartz & Nissen

[57] ABSTRACT

A valve device for gases comprises a pilot valve for controlling the degree of valve opening of a main valve installed in a gas pipe line, a main rotating shaft which can undergo rotation by which the degree of valve opening of the pilot valve is controlled, a sliding member actuated by the rotation of the main rotating shaft to undergo sliding movement in a specific range thereby to control the degree of valve opening of the pilot valve, an electric motor for rotating the main rotating shaft, a screw shaft to which the rotation of the main rotating shaft, after being multiplied in number of revolutions, is transmitted, a moving structure moved translationally by the rotation of the screw shaft, and limit switches disposed at limit positions defining the range of movement of the moving structure and being actuated when the moving structure reaches the limit positions thereby to cut off power supply to the motor. The range of movement of the moving structure is set greater than the range of sliding movement of the sliding member.

7 Claims, 8 Drawing Figures

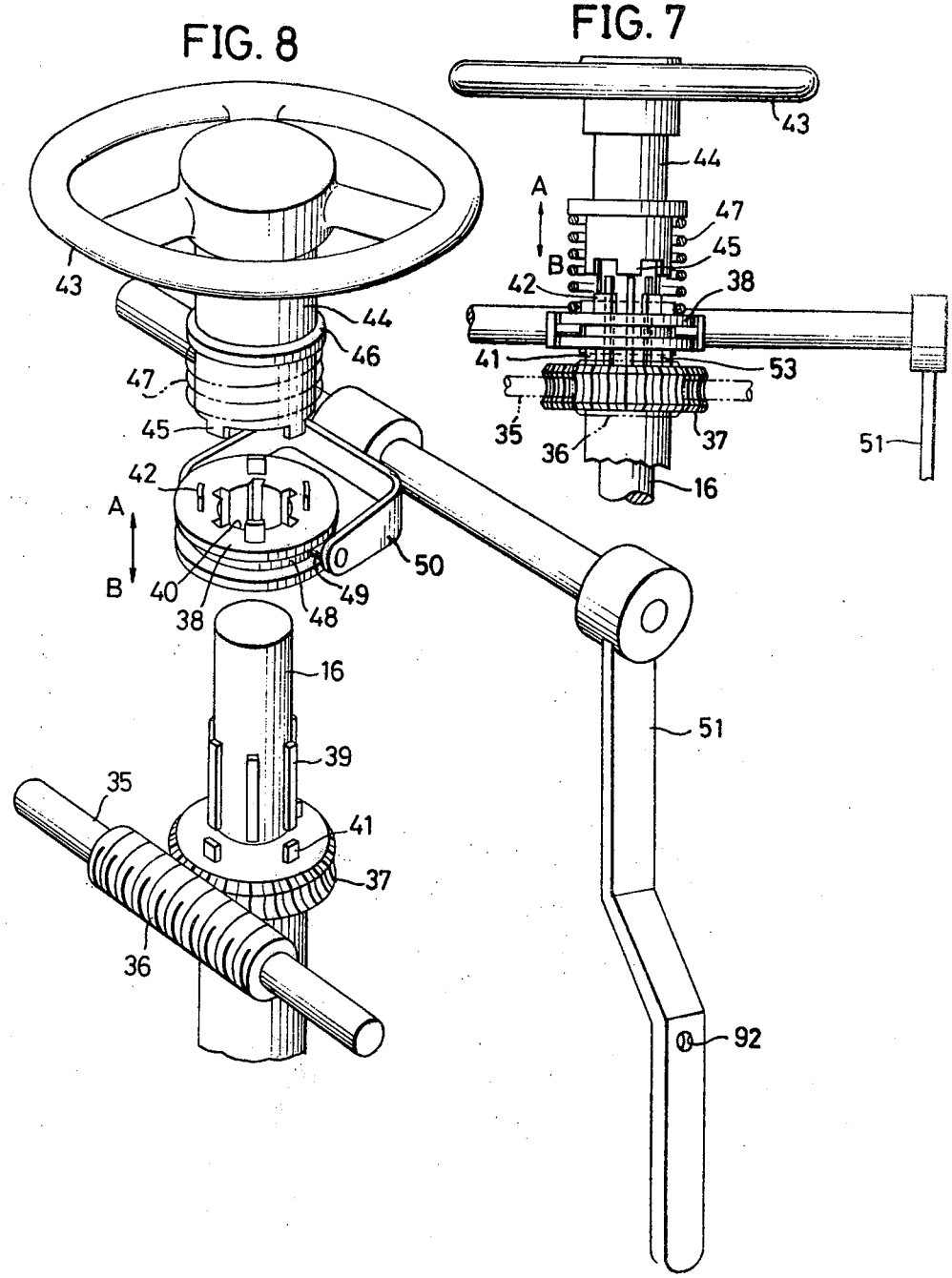

VALVE DEVICE FOR GASES

BACKGROUND OF THE INVENTION

The present invention relates generally to valve devices for gases and more particularly to a valve device for gases of a type wherein, by turning in forward and reverse directions a main rotating shaft for controlling the degree of valve opening, a sliding member is caused to undergo displacement by rotations of the main rotating shaft thereby to vary controllably the valve opening degree.

Heretofore, as a valve device for gases of this kind wherein the degree of opening of a valve structure is controlled by rotating in forward and reverse directions a main rotating shaft for controlling the valve opening degree, there has been a device so adapted that the quantity of rotation of the main rotating shaft for valve opening degree control is detected to produce a detection signal, which is fed as input into a controller thereby to control the quantity of rotation of the main rotating shaft and thereby to control the valve opening degree to a desired setting value.

In this known device, the quantity of rotation of the main rotating shaft is controlled by direct detection thereof, and for this reason there have been problems such as the difficulty of accomplishing highly accurate and positive control of the valve opening degree.

In addition, in the prior art, there has been another device of a construction in which a limit switch is provided within the path of movement of a reciprocating control plate screw engaged through female threads with male threads provided on a main rotating shaft and is adapted to be closed when the reciprocating control plate reaches a predetermined position thereby to stop the rotation of the main rotating shaft and control the valve opening at a specific value.

In this known device, the reciprocating control plate is caused to move by direct screw driving action resulting from rotation of the main rotating shaft for valve opening control. For this reason, the range of movement of the reciprocating control plate is narrow, whereby there has been the difficulty of carrying out highly accurate and positive valve opening control.

Furthermore, in known devices of the instant kind, if the rotation of the main rotating shaft for valve opening control is continued even after it has reached its normal control limit point, excessive force will be exerted on the diaphragms of a pilot valve, and in extreme cases, the diaphragms may be ruptured.

SUMMARY OF THE INVENTION

Accordingly, it is a general object of the present invention to provide a novel and useful valve device for gases in which the above described difficulties are overcome.

A specific object of the invention is to provide a device in which the number of revolutions of rotation of a main rotating shaft for valve opening control is magnified and transmitted to cause a moving member to move translationally over a great range, and the degree of the valve opening is controlled by cooperative operation of the moving member and a limit switch provided at a specific position. By this provision of the invention, the range of movement of the above mentioned moving member can be made large, and at the same time, the range of positional adjustment of the limit switch can also be widened. Accordingly, the valve opening control can be carried out with great accuracy, and, moreover, the positional adjustment of the limit switch is facilitated since it can be carried out linearly.

Another object of the invention is to provide a valve device for gases which is so adapted that excessive force will not be exerted on the diaphragms of a pilot valve even if the main rotating shaft for valve opening control is turned over and beyond the control range limit.

Still another object of the invention is to provide a valve device for gases in which the quantity of sliding movement of a sliding member which slides in accordance with the rotation of the main rotating shaft for valve opening control and causes deflection of the diaphragms of a pilot valve can be finely adjusted.

A further object of the invention is to provide a valve device for gases which is so adapted that the main rotating shaft for valve opening control can be driven in rotation by an electric motor or by manual operation, and these two kinds of drivings can be selectively changed over.

Other objects and further features of the invention will be apparent from the following detailed description with respect to a preferred embodiment of the invention when read in conjunction with the accompanying drawings.

BRIEF DESCRIPTION OF THE DRAWINGS

In the drawings:

FIG. 7 is an elevation, with parts cut away, showing an electric operation - manual operation changeover mechanism in the device illustrated in FIG. 1; and FIG. 8 is an exploded perspective view of the changeover mechanism shown in FIG. 7.

DETAILED DESCRIPTION

Figure 1:
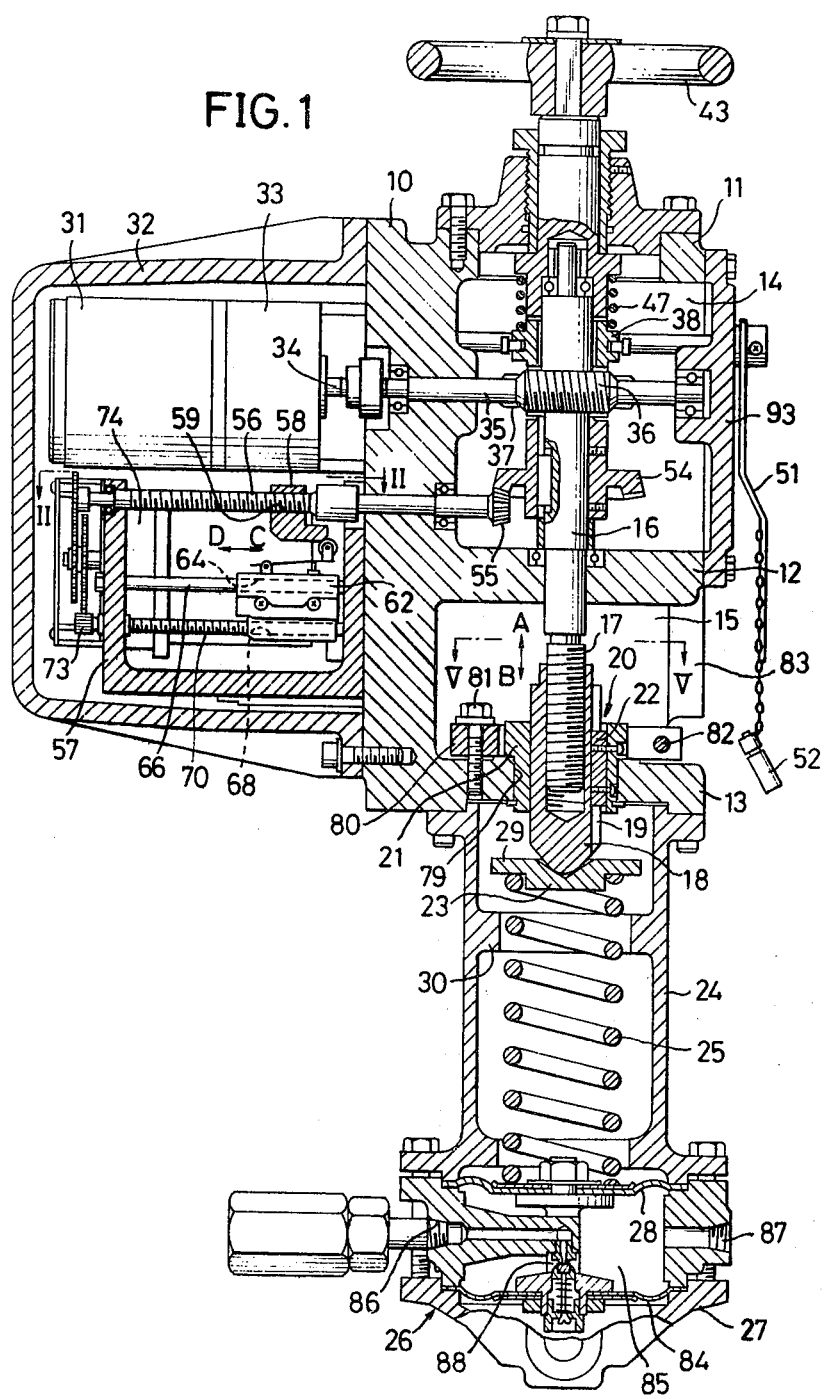
FIG. 1 is an elevation, in vertical section, showing one embodiment of a valve device for gases according to the invention.

In one embodiment of the valve device for gases according to the present invention as shown in elevation in FIG. 1, there is provided a casing body 10 having an upper wall 11, a middle wall 12, and a lower wall 13, between which are formed chambers 14 and 15. A main rotating shaft 16 for control of degree of valve opening (hereinafter referred to simply as "main shaft") extends vertically through the walls 11, 12, and 13 and is rotatably supported in a manner permitting its rotation in two directions (forward and reverse).

Female screw threads tapped on the inner wall surface of a sliding member 18 of hollow cylindrical shape with a conical lower end are screw meshed with male screw threads 17 formed on the lower end part of the main shaft 16. This sliding member 18 has a spline 19 formed in its cylindrical surface in a direction of its axis and engaged by a projection 22 provided on a holding member 21 of a fine adjustment mechanism 20 described hereinafter. Consequently, the sliding member 18 is prevented from rotating about its axis and is free to slide only in its axial directions (arrow directions A and B in FIG. 1).

The lower extremity of the sliding member 18 abuts against a spring retainer 23 which is seated on the upper end of coil spring 25 within a vertical cylinder 24 fixed at its upper end to the lower surface of the aforementioned lower wall 13 of the casing body 10. The lower end of the spring 25 abuts against the upper surface of an upper diaphragm 28 installed within a casing 27 of a pilot valve 26 fixed to the lower end of the cylinder 24.

The cylinder 24 is provided with an inwardly projecting annular shelf 30 for engaging and stopping a flange 29 of the spring retainer 23.

An electric motor 31 is enclosed within a cover 32 of pressure and explosion-proof construction fixed to the casing body 10. This motor 31 has a gear head 33 for speed reduction and an output shaft 34 through which the motor output power is transmitted to a worm shaft 35 coupled thereto and supporting a worm 36, which is meshed with a worm wheel 37 mounted on an upper part of the main shaft 16 in a manner whereby it is prevented from moving axially but is free to rotate about its axis.

A clutch 38, as shown in FIGS. 7 and 8, has a central hole 40 of a planar shape for fitting in an axially slidable manner on a spline shaft part 39 of the main shaft 16 and has projections 53 on its lower surface for engagement with projections 41 provided on the upper surface of the worm wheel 37. The clutch 38 further has projections 42 on its upper surface. A manually turnable wheel handle 43 is fixed to the upper end of a vertical shaft 44 rotatably supported in coaxial alignment with the clutch 38, the worm wheel 37 and the main shaft 16. The lower end of the shaft 44 is provided with projections 45 for engagement with the projections 42 of the clutch 38. A coil spring 47 is interposed between an annular flange 46 disposed around the shaft 44 and the upper surface of the clutch 38 and is continually urging the clutch 38 in the downward direction for engagement with the worm wheel 37.

An annular groove 48 is formed around the peripheral surface of the clutch 38 and is slidably engaged by pins 49 disposed substantially on diametrically opposite sides of the clutch 38 and fixed at their outer ends to the outer ends of the two arms of a forked yoke 50. The base part of the yoke 50 is fixedly mounted to a changeover lever 51. Accordingly, rotation of the lever 51 is transmitted through the yoke 50 and its pins 49 and converted into vertical movement of the clutch 38. A lock pin 52 is provided for locking the rotational position of the changeover lever 51.

A crown gear 54 of relatively large diameter is fixedly mounted on the main shaft 16 at approximately the middle part thereof. A bevel pinion 55 of relatively small diameter is meshed with the crown gear 54 and is fixedly mounted on one end of a horizontal rotating screw shaft 56, which is rotatably and horizontally supported on a frame 57 fixed to an outer side surface of the casing body 10 and enclosed within the cover 32. The rotation of the main shaft 16 is multiplied in number of revolutions in accordance with the gear ratio (for example 1:5) of the gears 54 and 55 and is thus transmitted to the rotating screw shaft 56.

Figure 2:
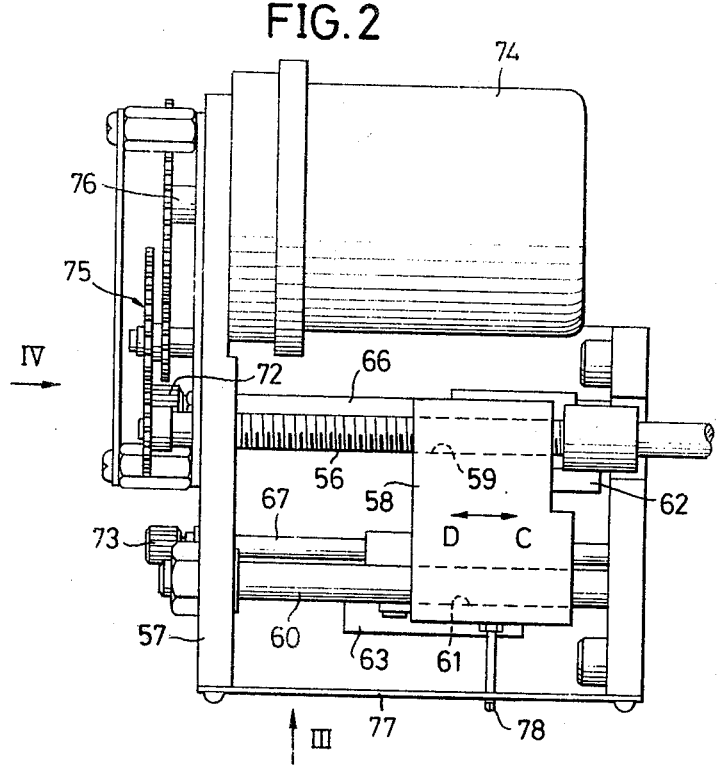
FIG. 2 is an enlarged plan view taken along the line II—II in FIG. 1, as viewed in the arrow direction, showing a mechanism for adjusting limits of valve opening control.

The screw shaft 56 is screw meshed with a tapped hole 59 provided on one part of a carriage structure 58 as shown in FIG. 2. The carriage structure 58 is provided at a part spaced apart from the tapped hole 59 with a smoothbore hole 61, which is slidably fitted on a guide rod 60 fixedly supported parallelly to the screw shaft 56 by the frame 57. Accordingly, the carriage structure 58 is caused to move translationally in a straight line in the arrow directions C and D by the forward and reverse rotations of the screw shaft 56.

Figure 3:
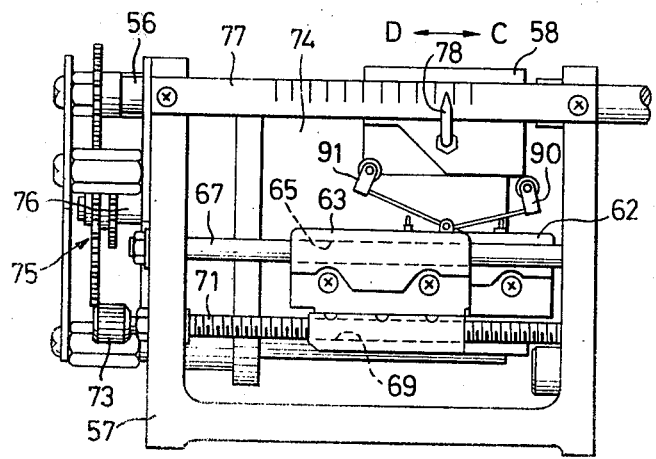
FIG. 3 is an elevation, with a part cut away and as viewed in the arrow direction III in FIG. 2, of the adjusting mechanism.
Figure 6:
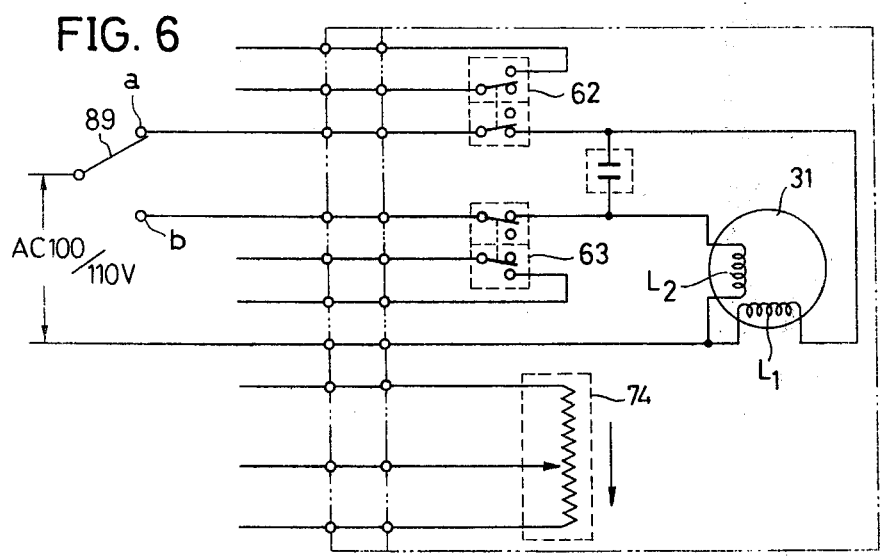
FIG. 6 is a circuit diagram showing an example of a rotational driving circuit of a motor for rotating a main rotating shaft for valve opening control.

Limit switches 62 and 63 are respectively mounted at positions corresponding to the limit points at the two ends of the range of movement of the carriage structure 58 as shown in FIGS. 1, 2, and 3. Carriers of the limit switches 62 and 63 are respectively provided at their upper parts with through-holes 64 and 65 which are slidably fitted on guide rods 66 and 67 and at their lower parts with tapped holes 68 and 69 which are screw meshed with screw shafts 70 and 71. Accordingly, the limit switches 62 and 63 are caused by the rotation of the screw shafts 70 and 71 to move in the arrow direction C or D as they are guided by the guide rods 66 and 67. The screw shafts 70 and 71 are provided at their outer ends with knobs 72 and 73. The guide rods 68, 69 and screw shafts 70, 71 are parallel with the screw shaft 56. The limit switches 62 and 63 are electrically connected to the aforementioned motor 31 as indicated in FIG. 6.

Figure 4:
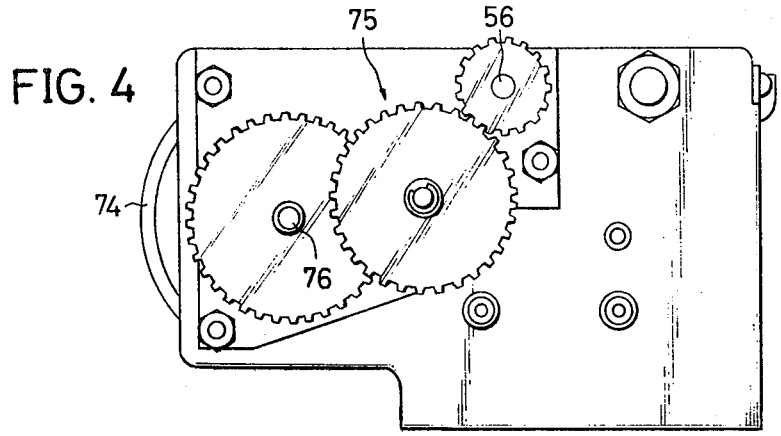
FIG. 4 is an elevation, as viewed in the arrow direction IV in FIG. 2, of the adjusting mechanism.

A potentiometer 74 having a rotatable shaft 76 is further mounted on the frame 57. The outer end of the above mentioned screw shaft 56 is coupled through a gear train 75 to the shaft 76 of the potentiometer 74 as best shown in FIG. 4. The resistance value of the potentiometer is varied by the rotation of its shaft 76. Furthermore, a calibrated scale plate 77 is fixed to the frame 57 and functions cooperatively with a pointer 78 fixed to the carriage structure 58 to indicate the position of the carriage structure 58.

Figure 5:
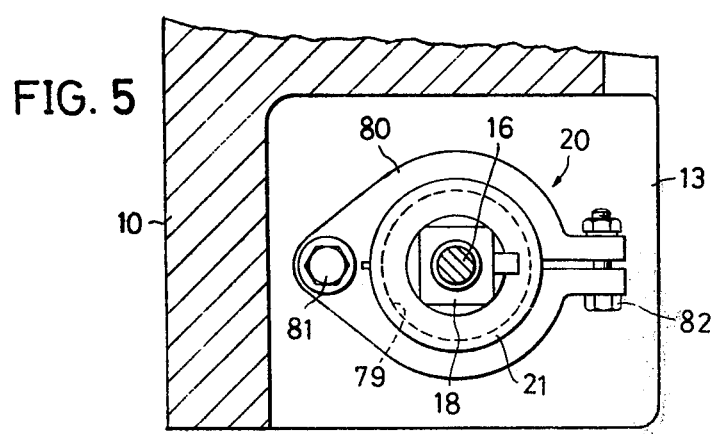
FIG. 5 is a plan view, partly in section, taken along the line V—V in FIG. 1 as viewed in the arrow direction.

The aforementioned fine adjustment mechanism 20 comprises the aforementioned holding member 21 fitted and held in a manner permitting its rotation but not its sliding in the axial direction in a hole 79 in the lower wall 13 of the casing body 10 and a clamping member 80 fitted around and clamping the outer peripheral part of the holding member 21. The clamping member 80 has the shape of a split ring with a gap at one part thereof as shown in FIG. 5 and is fixed to the upper surface of the lower wall 13 by a bolt 81. A bolt 82 for tightening with a nut is provided through one end of the clamping member 80 across the above mentioned gap. By tightening the nut on the bolt 82, the holding member 21 is held fixed and prevented from rotating relative to the lower wall 13. When the nut on the bolt is loosened, the holding member 21 assumes a rotatable state relative to the lower wall 13.

In the aforementioned pilot valve 26, another diaphragm 84 is disposed coaxially below and spaced apart in opposed state relative to the aforementioned diaphragm 28, and these two diaphragms 28 and 84 form therebetween a pressure flowing chamber 85. A valve mechanism 88 is provided between an inlet 86 and the pressure flowing chamber 85 and is so adapted that its degree of opening varies in accordance with deflection of the lower diaphragm 84. The casing 27 further has an outlet 87. The fluid pressure supplied through the inlet 86 is controlled in accordance with the degree of valve opening of the valve mechanism 88, and control of the degree of opening of a main valve (not shown) provided at an intermediate point in a gas pipe line (not shown) is accomplished by pressure of the fluid discharged through the outlet 87.

The term "gas" used in the specification and appended claims to designate the gas flowing through the gas pipe line is not limited to city gas but is intended to include any kind of gas, such as LPG or air, which is conveyed through a pipe line.

The valve device of the above described construction according to this invention operates as follows. First, by turning the knobs 72 and 73 in appropriate direction, the limit switches 62 and 63 are moved in the arrow direction C or D and thus adjusted into desired positions. The changeover lever 51 is turned counterclockwise (as viewed in FIG. 8) to engage the clutch 38 with the worm wheel 37 so that the rotation of the worm wheel 37 will be transmitted to the main shaft 16. The clutch 38 at this time is disengaged from the shaft 44 of the handle wheel 43.

Then, when the movable contact of a power supply switch 89 of the circuit shown in FIG. 6 is placed in contact with a contact a thereby to switch on the power supply, an electric current flows through a winding L1 of the motor 31, which thereupon rotates in one direction. This rotation of the motor output shaft 34 is transmitted through the worm shaft 35, the worm 36, the worm wheel 37, and the clutch 38 to the main shaft 16, which thereby rotates in one direction. The sliding member 18 is thereby caused to slide in the arrow direction A since its female screw threads are meshed with the male screw threads 17 of the main shaft 16, and, moreover, since it is held in a manner preventing its rotation but permitting its vertical sliding movement by the holding member 21.

Then, the spring retainer 23 also undergoes displacement, being urged by the force of the spring 25 to follow the sliding movement of the sliding member 18. Since the spring 25 thereby elongates, its spring force decreases. Consequently, the diaphragms 28 and 84 of the pilot valve 26 also rise, and the opening degree of the valve mechanism 88 becomes small, whereby the main valve provided at the gas pipe line gradually becomes large.

As the main shaft 16 thus rotates in one direction, this rotation is transmitted through the gears 54 and 55 to the screw shaft 56, which thereby rotates in one direction. As a consequence, the carriage structure 58 screw engaged with this screw shaft 56 moves in a straight line in the arrow direction C. Then, when the carriage structure 58 reaches a limiting position setting a limit of the range of its movement, it pushes an actuator 90 of the limit switch 62, which is thereby opened. Consequently, the power supply to the motor 31 is cut off, and the motor 31 stops. Accordingly, rotational torque is no longer transmitted to the main shaft 16, which thereupon stops rotating, and the sliding member 18 also stops sliding in the arrow direction A. The opening degree of the valve mechanism 88 of the pilot valve 26 does not become smaller than this minimum degree at the time, whereby the opening degree of the main valve in the gas pipe line does not become larger than the maximum opening degree.

On the other hand, when the movable contact of the power supply switch 89 is moved into contact with the contact b, an electric current flows through a winding L2 of the motor 31, whereupon the motor 31 rotates in the reverse or opposite direction. As a consequence, the main shaft 16 rotates in the opposite direction, whereby the sliding member 18 slides in the arrow direction B, thereby pushing the spring retainer 29 downward. The spring 25 is thereby compressed, and its spring force increases. Consequently, the diaphragms 28 and 84 are forced downward, and the opening degree of the valve mechanism 88 becomes large, whereby the opening degree of the main valve gradually becomes small.

Furthermore, as another result of the rotation of the main shaft 16 in the opposite direction, the screw shaft 56 also rotates in the opposite direction, and the carriage structure 58 moves in the arrow direction D. When the carriage structure 58 reaches the limiting position of the other limit of the range of its travel, it pushes an actuator 91 of the limit switch 63, which is thereby opened. The motor 31 is thereby cut off from its power supply and stops its rotation.

Consequently, the main shaft 16 also stops rotating, whereby the sliding member 18 stops sliding in the arrow direction B. The valve mechanism 88 of the pilot valve 26 does not become larger than the maximum opening degree at the time, and the opening degree of the main valve of the gas pipe line becomes minimum.

As described above, the maximum and minimum opening degree of the main valve are determined by the positions of the limit switches 62 and 63. Accordingly, these specific states of the degree of opening of the main valve can be finely adjusted by turning the knobs 72 and 73 thereby to accomplish fine adjustment of the positions of the limit switches 62 and 63. Furthermore, each position to which the carriage structure 58 has moved can be easily read from the indication of the pointer 78 on the calibrated scale plate 77.

Since the rotation of the main shaft 16 is multiplied in number of revolutions by the gears 54 and 55 and is then transmitted in that multiplied state at the screw shaft 56, the range of travel of the carriage structure 58 can be made greater than the range of sliding movement of the sliding member 18. Accordingly, the error in the limiting position of the sliding movement of the sliding member 18 due to an error in the set positions of the limit switches 62 and 63 is relatively small, and, therefore, setting of the degree of opening of the valve can be accomplished with high accuracy.

In the case where, at the time of rotation of the main shaft 16 in the above mentioned reverse or opposite direction, the rotation of the motor 31 does not stop when the carriage structure 58 pushes the actuator 91 of the limit switch 63 because of some malfunctioning, the main shaft 16 continues rotating, and the sliding member 18 and the spring retainer 23 also continue their movement in the arrow direction B. However, when the flange 29 of the spring retainer 23 reaches a position where it is engaged and arrested mechanically by the projection 30 of the cylinder 24, the downward movement of the spring retainer 23 in the arrow direction B is suppressed, and the spring retainer 23 is prevented from descending any further. Accordingly, the spring 25 is not compressed further, and rupturing of the diaphragms of the pilot valve 26 is prevented.

The potentiometer 74 varies its resistance value in accordance with the rotation of the main shaft 16. From this relationship, the degree of opening of the main valve can be continuously detected with high accuracy. The detected output is supplied to a controller (not shown) for continuously controlling the opening degree of the main valve.

While, in the above described embodiment of the invention, two limit switches are used, the number of limit switches need not be so limited, it being possible to provide three or more limit switches to detect intermediate points other than the range limits and thereby to effect control.

Furthermore, the position of the sliding member 18 relative to the main shaft 16 is adjusted by loosening the nut of the bolt 82 and enabling the holding member 21 to rotate relative to the clamping member 80. Then, a tool (not shown) for rotating is inserted into the chamber 15 through an opening 83 in the casing body 10 thereby to rotate the sliding member 18 unitarily together with the holding member 21. Thus, the position of the sliding member 18 relative to the main shaft 16 is varied and adjusted. After the position of the sliding member 18 relative to the main shaft 16 has been appropriately adjusted in this manner, the nut on the bolt 82 is retightened thereby to fix the holding member 21 by means of the clamping member 80 against rotation. Then, since the sliding member 18 no longer rotates, its position relative to the main shaft 16 cannot change.

In the case where the valve opening control is carried out by manual operation instead of by means of the motor 31, the changeover lever 51 is turned in the direction for forcing the clutch 38 to separate from the worm wheel 37 against the force of the spring 47. The projections of the clutch 38 thereby disengage from the projections 41 of the worm wheel 37, and, at the same time, the projections 42 of the clutch 38 and the projections 45 of the shaft 44 of the handle wheel 43 are placed in a state wherein they can engage. Even in this case, the clutch 38 is fitted on the spline shaft part 39 of the main shaft 16. Thereafter, the lock pin 52 is inserted through a hole 92 provided at the lever 51 and a hole (not shown) provided at a predetermined position of the cover 93 to lock the changeover lever 51 in the above described turned state.

Thus, the rotation of the worm wheel 37 is no longer transmitted to the main shaft 16, that is, the rotation transmission path from the motor 31 to the main shaft 16 is cut off. On the other hand, the rotation of the shaft 44 assumes a state wherein it is transmitted by way of the clutch 38 to the main shaft 16. Then, when the handle wheel 43 is manually turned, this rotation is transmitted by way of the shaft 44 and clutch 38 to the main shaft 16, and the sliding member 18 slides through a desired distance in the arrow direction A or B in accordance with the direction and amount of rotation of the main shaft 16. The degree of opening of the valve mechanism 88 of the pilot valve 26 is controlled in accordance with this movement of the sliding member 18, whereby the degree of opening of the main valve in the gas pipe line is controlled.

Further, this invention is not limited to these embodiments but various variations and modifications may be made without departing from the scope and spirit of the invention.

What is claimed is:

1. A valve device for gases comprising:
   a pilot valve for controlling the degree of opening of a main valve disposed in a gas pipe line;
   means including a sliding member and operated by sliding displacement of said sliding member to control the degree of opening of said pilot valve;
   a main rotating shaft adapted to be rotated thereby to drive the sliding member in said sliding displacement;
   an electric motor for rotating said main rotating shaft;
   a screw shaft rotated by the rotation of the main rotating shaft, said rotation being multiplied in number of revolutions and then transmitted to said screw shaft;
   a moving structure screw meshed with said screw shaft and thereby driven in translational movement by the rotation of the screw shaft; and
   limit switch means disposed at limit positions defining the range of movement of said moving structure corresponding to limits defining the range of sliding movement of at least the sliding member and opened when the moving structure reaches either of said limit positions thereby to cut off power supply to said electric motor,
   said range of movement of the moving structure being set at a greater value than a range of sliding movement of said sliding member, both movements being due to the rotation of the main rotating shaft.

2. A valve device for gases as claimed in claim 1 which further comprises adjustment means comprising limit switch holding structures adapted to hold said limit switch means and having respective tapped holes and screw shafts for adjustment screw meshed respectively with said limit switch holding structures and operated by the rotations of said screw shafts for adjustment to adjust, through the limit switch holding structures, setting positions of the limit switch means.

3. A valve device for gases as claimed in claim 1 which further comprises means operating when the sliding member slides outside of a normal range of sliding movement to suppress mechanically the sliding movement of the sliding member.

4. A valve device for gases as claimed in claim 1 in which said means for controlling the degree of opening of the pilot valve comprises a valve mechanism of the pilot valve, diaphragms for controlling said valve mechanism, a spring operating according to compression or elongation thereof to deflect said diaphragms, and a spring retainer retaining one end of said spring and abutted by said sliding member thereby to undergo displacement in accompaniment with the sliding movement of the sliding member, said spring retainer having a flange part, and in which there is further provided a projection for mechanically engaging and stopping said flange part thereby to suppress displacement thereof when the sliding member slides outside its normal range of sliding movement.

5. A valve device for gases as claimed in claim 1 which further comprises a holding member for holding said sliding member in a manner preventing rotation thereof but freely permitting sliding movement thereof in the axial direction of the main rotating shaft and a fixing member for fixing said holding member together with the sliding member in a manner enabling rotational adjustment thereof relative to the main rotating shaft, whereby the sliding member can be adjusted in position relative to the main rotating shaft by the rotational adjustment of the sliding member together with the holding member.

6. A valve device for gases as claimed in claim 1 which further comprises a manually rotatable shaft provided in coaxial alignment with said main rotating shaft and clutch means for selectively changing over between rotation due to said motor and rotation of said manually rotatable shaft and transmitting the rotation thus selected to the main rotating shaft.

7. A valve device for gases as claimed in claim 1 which further comprises means to which the rotation of one of said screw shafts is transmitted, and which thereupon undergoes a variation in the electrical resistance value thereof in accordance with said rotation of the screw shaft and thereby detects the degree of opening of said main valve indirectly from said resistance value.

* * * * *